2,973,304
Patented Feb. 28, 1961

2,973,304
FERMENTATION PROCESS

Hsing T. Huang, Fresh Meadows, N.Y., assignor to Chas. Pfizer & Co., Inc., Brooklyn, N.Y., a corporation of Delaware No Drawing. Filed Oct. 2, 1958, Ser. No. 764,748

5 Claims. (Cl. 195—47)

This invention is concerned with a new fermentation process for the production of L-phenylalanine. More particularly, it is concerned with the production of L-phenylalanine by the cultivation of an *E. coli* mutant.

L-phenylalanine is an important essential amino acid which is useful in human nutrition, nutrition studies and also in the synthesis of peptides which is of considerable current biological interest. Although DL-phenylalanine may be produced by chemical synthetic methods and numerous articles are found describing such processes, there is no reference in the literature to the preparation of L-phenylalanine by fermentation processes. The advantage of the present fermentation process lies in the fact that L-phenylalanine is selectively produced, thus avoiding a mixture, i.e. DL-phenylalanine, from which L-phenylalanine must be separated by costly methods of resolution.

It has been surprisingly found that an auxotrophic mutant of *E. coli* which requires L-tyrosine for growth accumulates appreciable quantities of L-phenylalanine when cultivated in certain nutrient media. A living culture of this single auxotroph of *E. coli* has been deposited in the American Type Culture Collection, Washington, D.C., where it has been assigned the number ATCC 13281. Such an auxotroph may be obtained by ultraviolet treatment followed by selection with pencillin of a wild strain of *E. coli*. This procedure is well known to those skilled in the art and commonly employed in the mutation of microorganisms.

The present invention provides an economical and practical method of preparing L-phenylalanine, an important essential amino acid. The process of the present invention is accomplished by the aerated, deep-tank, i.e. submerged, fermentation of *E. coli*, ATCC 13281, in a nutrient medium. Such nutrient media usually comprise a carbon source, a source of nitrogen and a source of metals required for the organism's growth, for example, potassium and magnesium. Sucrose is a suitable carbon source. Other carbon sources which may be employed are sorbitol, glycerol and mannitol. When glucose is employed, extremely poor yields may be obtained. Crude beet molasses which usually contains from about 40% to about 60% by weight of sucrose is a suitable carbon source.

As mentioned above, the single auxotroph of this invention requires L-tyrosine for growth. A particularly effective source of this amino acid is cornsteep liquor although other sources of L-tyrosine may be employed, for example, acid hydrolyzed casein which contains approximately 8% by weight of L-tyrosine. The amino acid L-tyrosine may also be employed.

Usually, best results are obtained when employing as the carbon source glycerol, mannitol, sorbitol or sucrose or mixtures thereof. Usually from about 10 to about 50 grams per liter of carbon source is found to give best results. Sufficient crude beet molasses to provide this range of sucrose concentration is also found to give almost identical results. For example, a beet molasses which is 40% by weight of sucrose may be employed in amounts of from about 25 to about 125 grams per liter of nutrient medium to provide sufficient sucrose. Generally, from about 10 to 60 grams per liter of cornsteep liquor is found to provide sufficient L-tyrosine resulting in good yields of L-phenylalanine. When cornsteep liquor is not employed, L-tyrosine may be added to the nutrient medium in sufficient quantities to provide a concentration of from about 10 to 200 milligrams per liter. The yield of L-phenylalanine falls off with higher concentrations of L-tyrosine.

The fermentation may be carried out at a temperature from about 20° to about 40° C. although a temperature from about 25° to 40° C. is preferred. The fermentation process is best effected at a pH of from about 6.0 to 8.0. The medium is preferably aerated at a rate of from about ½ to 1 volume of air per volume of medium per minute and stirred vigorously. The optimum time for the process may be conveniently determined by paper chromatographic analysis of the L-phenylalanine content of the reaction medium, a procedure which is commonly employed in fermentation processes. Generally, time periods of from 40 to 60 hours give best results with no advantage being realized from longer periods of fermentation.

After the fermentation is complete L-phenylalanine may be isolated by standard procedures such as ion exchange methods. For example, the L-phenylalanine may be recovered by adjusting the pH of the medium to about two with hydrochloric acid, filtering and passing the filtrate through a strong cation exchange resin such as sulfonic acid resin, Amberlite IR–120 (Rohm and Haas Co.). The L-phenylalanine is eluted with dilute ammonium hydroxide, the eluate freed of ammonia by heating and L-phenylalanine obtained by evaporation of the eluate. The amino acid may be further purified by standard methods of recrystallization.

The following examples are given by way of illustration and are not to be construed as limitations of this invention many variations of which are possible within the scope and spirit thereof.

*Example 1*

*E. coli*, ATCC 13281, was inoculated from an agar slant into 1 liter of an inoculum, previously sterilized at 20 pounds/square inch pressure for 30 minutes, having the following composition:

|  | G./l. |
|---|---|
| Glycerol | 2 |
| $K_2HPO_4$ | 1 |
| $(NH_4)_2HPO_4$ | 10 |
| $MgSO_4 \cdot 7H_2O$ | 0.1 |
| Acid-hydrolyzed casein | 2.5 |

The inoculum was incubated for 16 hours at 28° C.

A production medium was prepared having the following composition:

|  | G./l. |
|---|---|
| $K_2HPO_4$ | 1 |
| $(NH_4)_2HPO_4$ | 10 |
| Cornsteep liquor | 20 |
| $MgSO_4 \cdot 7H_2O$ | 0.1 |
| Glycerol | 20 | pH adjusted to 7.0 with $NH_4OH$.

One hundred milliliters of the inoculum was added to 2 liters of the production medium in a fermenter flask previously sterilized by autoclaving at 20 pounds/square inch for 30 minutes. The broth was stirred at 1750 revolutions/minute and aerated at a rate of 1 volume of air per volume of reaction medium per minute at a temperature of 28° C. After 48 hours, the mixture assayed at 2 grams per liter of L-phenylalanine which was isolated by ion exchange treatment.

*Example II*

E. coli, ATCC 13281, was inoculated from an agar slant into one liter of an inoculum as described in Example I.

One hundred milliliters of this inoculum was added to 2 liters of a production medium in a fermenter flask having the following composition:

| | |
|---|---|
| Sorbitol | g./l.   20 |
| L-tyrosine | mg./l.  50 |
| $MgSO_4 \cdot 7H_2O$ | g./l.  0.5 |
| $(NH_4)_2HPO_4$ | g./l.  10 |
| $K_2HPO_4$ | g./l.   5 |

The mixture was stirred and aerated as in Example I at 28° C. After 50 hours, the mixture assayed at 2 grams per liter of L-phenylalanine which was obtained by ion exchange treatment.

*Example III*

Production media as in Example I containing sucrose, sorbitol and/or mannitol in place of glycerol are used for cultivation with E. coli, ATCC 13281, under the conditions described above with equivalent results. In each case, L-phenylalanine is isolated by ion exchange treatment.

What is claimed is:

1. A process for the production of L-phenylalanine which process comprises cultivating under submerged, aerobic conditions at a pH from about 6.0 to about 8.0 E. coli, ATCC 13281, in an aqueous nutrient medium comprising a carbon source selected from the group consisting of glycerol, sorbitol, mannitol, sucrose and mixtures thereof, a source of nitrogen, a source of magnesium, potassium, and trace metals in the presence of from about 10 to about 200 milligrams of L-tyrosine per liter of nutrient medium.

2. A process for the production of L-phenylalanine as claimed in claim 1 wherein the L-tyrosine is provided by utilizing from about 10 to about 60 grams of cornsteep liquor per liter of nutrient medium.

3. A process for the production of L-phenylalanine as claimed in claim 1 wherein the L-tyrosine is provided by utilizing acid-hydrolyzed casein containing about 8% by weight of L-tyrosine.

4. A process for the production of L-phenylalanine as claimed in claim 1 wherein from about 10 to about 50 grams of glycerol per liter of nutrient medium is employed.

5. A process for the production of L-phenylalanine as claimed in claim 1 wherein from about 10 to about 50 grams of sorbitol per liter of nutrient medium is employed.

References Cited in the file of this patent

Annual Review of Microbiology, vol. 9, page 128 (1955).

Biochemistry of The Amino Acids (Meister), pages 346 to 349, Academic Press, New York, 1957.

Chemical Abstracts, vol. 50: 9517a (Davis), 1956.